Patented Jan. 20, 1931                                           1,789,538

UNITED STATES PATENT OFFICE

JOHN S. BEEKLEY, OF WILMINGTON, DELAWARE, ASSIGNOR TO DU PONT AMMONIA CORPORATION, OF WILMINGTON, DELAWARE, A CORPORATION OF DELAWARE

PROCESS OF PRODUCING HYDROGEN FROM STEAM AND CARBON MONOXIDE

No Drawing.       Application filed November 12, 1926. Serial No. 148,113.

This invention relates to a method of producing hydrogen from gaseous mixtures of steam and carbon monoxide with the aid of a chromium oxide catalyst.

Because of the rapidly increasing consumption of hydrogen, particularly in such processes as the hydrogenation of oils and the synthesis of ammonia, the development of an abundant supply of hydrogen at relatively low cost is of great economic importance.

It is known that gaseous mixtures containing steam and carbon monoxide will react in the presence of suitable catalytic agents to produce hydrogen and carbon dioxide in accordance with the reaction:

$$CO + H_2O = CO_2 + H_2.$$

This reaction is particularly adapted for application to the commercial production of hydrogen because it is possible thereby to use as raw materials coke oven gas, water gas, producer gas and the like, which are comparatively cheap and available in large quantities.

In my co-pending application Serial No. 148,114 it is shown that chromium oxide is an active catalyst for the above reaction and that its use is especially advantageous, since it has been discovered to be unaffected by sulfur compounds which act as poisons for most catalysts. Thus, by using chromium oxide as a catalyst, hydrogen may be produced from steam and commercial carbon monoxide—containing gases such as the above-mentioned without necessity for the preliminary removal of sulfur compounds therefrom. Furthermore, chromium oxide appears to be a poor catalyst for the reaction:

$$2CO = CO_2 + C.$$

so that it may be used to catalyze the production of hydrogen from carbon monoxide and steam without deposition of carbon upon the catalyst, under conditions which in the case of iron, nickel or cobalt would result in the deposition of considerable and very objectionable quantities of carbon.

The co-pending application of Roger Williams, Serial No. 148,105, describes a new form of chromium oxide for catalytic purposes which is particularly useful in the manufacture of hydrogen from gaseous mixtures of steam and carbon monoxide. This catalyst, prepared by precipitating chromium oxide in the form of a gel, is characterized by a greater activity than chromium oxide prepared by ordinary methods of precipitation or by calcination. It has also been discovered that the catalytic activity of chromium oxide gel can be increased if after washing and drying it is ground and then formed into briquettes or pellets, for example, by compression in a machine such as is used in the preparation of pharmaceutical tablets.

According to the method described in the application last referred to, a solution of chrome alum is added rapidly to a solution of potassium hydroxide. The resulting colloidal solution yields on standing for some time a firm jelly which is broken up, washed, filtered and heated for several hours at about 130° C. The black, glassy product is then crushed into fragments of suitable size which are placed in the apparatus in which the conversion of carbon monoxide is to be effected. The temperature is thereupon gradually raised to about that at which the reaction is to be carried out and a mixture of steam and carbon monoxide is conducted over the catalyst, the gaseous mixture reacting to form hydrogen and carbon dioxide.

It is the object of the present invention to provide a further improvement in the processes described in the co-pending applications above referred to, by following a novel method of operation which favors the maintenance of a higher activity on the part of chromium oxide catalysts, thus facilitating the production of hydrogen from steam and carbon monoxide-containing gases.

Other objects and advantages of the invention will be apparent as it is better understood by reference to the following specifications in which the preferred embodiments are described.

I have discovered that in manufacturing hydrogen by the reaction of steam and carbon monoxide in contact with a chromium oxide catalyst prepared by a wet method, the catalyst may be caused to exhibit and maintain a greater activity if it is brought to reaction temperature in a non-oxidizing atmosphere. It has been found that when a freshly prepared catalyst is gradually heated in air, a spontaneous development of heat usually occurs at about 400° C. If the catalyst has previously been used in producing hydrogen so that it may be considered to contain adsorbed hydrogen, carbon monoxide or both, the temperature at which the spontaneous evolution of heat begins may be even lower, for example, as low as about 200° C. This may be due to the catalysis of the exothermic reaction of oxygen of the air with the adsorbed reducing gas, the heat thereby produced being sufficient to raise the temperature rapidly to the point at which the spontaneous heating takes place in the case of a freshly prepared catalyst. Also, if a catalyst has been heated in air, but not to the temperature at which the spontaneous heating effect occurs, on permitting it to cool and subsequently heating it in an atmosphere of reducing gas (a mixture of steam and carbon monoxide, for example), heat may be developed at a temperature as low as 200° C. In this case the initiation of the phenomenon at a lower temperature appears to be caused by the catalysis of the reaction between adsorbed oxygen and the reducing gas. In any event, the evolution of heat may be sufficient to raise the temperature of the catalyst 100° or more, or even to produce incandescence. A subsequent examination of the catalyst shows that it has assumed a much lighter color and has undergone partial disintegration. No explanation is offered as to the nature or mechanism of the change that occurs but it appears to result in a decrease in the activity of the catalyst. For, if in accordance with the present invention the catalyst is in the first place heated to reaction temperature in a non-oxidizing atmosphere, no spontaneous development of heat is observed, the catalyst retains substantially its original form, and its subsequent activity in the presence of a mixture of steam and carbon monoxide is greater than that exhibited by a catalyst that has been heated under such conditions as to produce the spontaneous thermal effect.

Hydrogen, steam, carbon monoxide, carbon dioxide, nitrogen and other so-called inert gases or mixtures of two or more of these may be employed for the non-oxidizing atmosphere in which the catalyst is heated.

It has also been discovered that a gas which would otherwise be unsuitable for the purpose because of its content of free oxygen may be employed if there be mixed with it a sufficient proportion of a reducing gas such as hydrogen or carbon monoxide. The reducing gas is preferably present in an amount at least chemically equivalent to the free oxygen. For example, commercial nitrogen containing only 0.3% of oxygen is not suitable for use alone but if 0.6% or more of hydrogen be added, the mixture may be satisfactorily employed. Similarly, air mixed with carbon monoxide in the volume ratio of 10:3 is adapted for the purpose. Consequently, gaseous mixtures comprising an oxygen-containing gas and a sufficient quantity of a reducing gas are to be considered as included in the term "non-oxidizing gases."

I have observed that the deleterious effect of free oxygen may be encountered not only during the preliminary heating of the catalyst to reaction temperature but also during interruptions of the operation when there may be an opportunity for air to contact with the hot catalyst. That is to say, the chromium oxide is not to be considered as stabilized against the action of free oxygen by an initial use, for if thereafter it be permitted to contact in a sufficiently heated condition with free oxygen in the absence of adequate quantities of reducing gas, it may undergo the deterioration previously referred to. If occasion arises, however, for allowing the catalyst to cool, this may be done satisfactorily and without loss in activity by maintaining a non-oxidizing atmosphere, preferably until a temperature of about 200° C. or less is reached. The non-oxidizing atmosphere may be constituted as hereinbefore indicated.

Generally speaking, the minimum temperature at which the spontaneous heating effect may be observed in the case of a given catalyst and under given circumstances cannot be definitely predetermined, the temperature being subject to some variation depending upon the previous history of the catalyst, such as conditions of precipitation, drying, the presence of impurities, etc.

The following example will serve to illustrate the preferred procedure in carrying out the invention, it being understood, however, that the invention is not limited to the details of the operation as herein described.

To one liter of a 2.6 normal solution of potassium hydroxide add rapidly an equal volume of a solution containing 250 grams of chrome alum while stirring the potassium hydroxide solution vigorously. (A three normal sodium hydroxide solution may be substituted for the same volume of potassium hydroxide solution). Allow the clear, dark green, colloidal solution obtained to set to a firm jelly and break this up and wash by decantation with water. Collect the washed product on a filter and heat for 24 hours at about 130° C. The material, which is black, glassy and hard, but easily fractured, is then crushed, ground to a fineness of 200 mesh and formed into briquets or pellets by compression in an apparatus such as is used in the manufacture of pharmaceutical tablets.

The catalyst briquets are broken into fragments of suitable size and placed in a silica tube disposed in an electric furnace. A mixture of equal parts of hydrogen and steam is now passed over the catalyst while the temperature is gradually raised to 500° C. This temperature is maintained and a gaseous mixture of four volumes of steam and one volume of commercial water gas containing 48% hydrogen and 44% carbon monoxide is passed over the catalyst at a space velocity of 1000 (i. e. 1000 c. c. of gas per c. c. of catalyst per hour, measured under standard conditions of temperature and pressure). The gases issuing from the apparatus should contain over 60% hydrogen with about 2% carbon monoxide and 29% carbon dioxide, all on a dry basis. If occasion arises for temporarily discontinuing the operation, the supply of water gas is cut off and steam alone is passed over the catalyst until its temperature is reduced to about 120° C. The flow of steam may then be stopped and the catalyst permitted to cool to room temperature in air. On renewing operations the same procedure is followed as hereinbefore described, i. e., the catalyst is gradually raised in temperature while a mixture of equal parts of steam and hydrogen is passed over it. When the temperature has reached about 500° C. the steam-hydrogen mixture is replaced by the steam-water gas mixture that is to react and the production of hydrogen goes on as before.

No explanation or theory is offered as to what changes in physical form or chemical composition may occur in the chromium oxide gel in the course of its drying, during the heating to reaction temperature or during the interaction of carbon monoxide and steam. The term "chromium oxide catalyst" as employed in the claims is intended, therefore, to include the contact mass as prepared, as well as any modified form in which it may exist during the reaction.

Various changes may be made in the operation as described without departing from the invention or sacrificing any of the advantages thereof.

I claim:—

1. The method of effecting gaseous reactions employing a chromium oxide catalyst, which comprises heating said catalyst to about the temperature at which the reaction is to be carried out, in a non-oxidizing atmosphere, and thereafter passing over it the gases to react.

2. The method of effecting gaseous reactions employing a chromium oxide gel catalyst, which comprises heating said catalyst to about the temperature at which the reaction is to be carried out, in a non-oxidizing atmosphere, and thereafter passing over it the gases to react.

3. The method of effecting gaseous reactions employing a chromium oxide gel catalyst, which comprises heating said catalyst from about 200° C. to about the temperature at which the reaction is to be carried out, in a non-oxidizing atmosphere, and thereafter passing over it the gases to react.

4. The process of manufacturing hydrogen by passing steam and carbon monoxide over a chromium oxide catalyst, which includes the step of preliminarily heating said catalyst in a non-oxidizing atmosphere.

5. The process of manufacturing hydrogen by passing steam and carbon monoxide over a chromium oxide catalyst, which includes the step of heating said catalyst to about the temperature at which the reaction is to be carried out, in a non-oxidizing atmosphere.

6. The process of manufacturing hydrogen by passing steam and carbon monoxide over a chromium oxide catalyst, which includes the step of heating said catalyst from about 200° C. to about the temperature at which the reaction is to be carried out, in a non-oxidizing atmosphere.

7. The process of manufacturing hydrogen by passing steam and carbon monoxide over a chromium oxide catalyst, which comprises heating said catalyst in a non-oxidizing atmosphere and thereafter passing over it the gases to react.

8. The process of manufacturing hydrogen by passing steam and carbon monoxide over a chromium oxide catalyst, which comprises heating said catalyst to about the temperature at which the reaction is to be carried out, in a non-oxidizing atmosphere, and thereafter passing over it the gases to react.

9. The process of manufacturing hydrogen by passing steam and carbon monoxide over a chromium oxide catalyst, which comprises heating said catalyst from about 200° C. to about the temperature at which the reaction is to be carried out, in a non-oxidizing atmosphere, and thereafter passing over it the gases to react.

10. The process of manufacturing hydrogen by passing steam and carbon monoxide over a chromium oxide gel catalyst, which includes the step of preliminary heating said catalyst in a non-oxidizing atmosphere.

11. The process of manufacturing hydrogen by passing steam and carbon monoxide over a chromium oxide gel catalyst, which includes the step of heating said catalyst to about the temperature at which the reaction is to be carried out, in a non-oxidizing atmosphere.

12. The process of manufacturing hydrogen by passing steam and carbon monoxide over a chromium oxide gel catalyst, which includes the step of heating said catalyst from about 200° C. to about the temperature at which the reaction is to be carried out, in a non-oxidizing atmosphere.

13. The process of manufacturing hydrogen by passing steam and carbon monoxide over a chromium oxide gel catalyst, which comprises heating said catalyst, in a non-oxidizing atmosphere, and thereafter passing over it the gases to react.

14. The process of manufacturing hydrogen by passing steam and carbon monoxide over a chromium oxide gel catalyst, which comprises heating said catalyst to about the temperature at which the reaction is to be carried out, in a non-oxidizing atmosphere, and thereafter passing over it the gases to react.

15. The process of manufacturing hydrogen by passing steam and carbon monoxide over a chromium oxide gel catalyst, which comprises heating said catalyst from about 200° C. to about the temperature at which the reaction is to be carried out, in a non-oxidizing atmosphere, and thereafter passing over it the gases to react.

16. A process of effecting a gaseous reaction employing a chromium oxide catalyst wherein the catalyst while at a temperature at which a spontaneous heating effect may occur is always maintained in a non-oxidizing atmosphere.

17. A process of manufacturing hydrogen by passing steam and carbon monoxide over a chromium oxide catalyst wherein the catalyst while at a temperature at which a spontaneous heating effect may occur is always maintained in a non-oxidizing atmosphere.

18. A process of manufacturing hydrogen by passing steam and carbon monoxide over a chromium oxide gel catalyst wherein the catalyst while at a temperature at which a spontaneous heating effect may occur is always maintained in a non-oxidizing atmosphere.

In testimony whereof I affix my signature.

JOHN S. BEEKLEY.